US00RE43869E

(19) United States
(12) Reissued Patent
Lewandowski et al.

(10) Patent Number: US RE43,869 E
(45) Date of Reissued Patent: Dec. 25, 2012

(54) COMPUTER DOCKING STATION FOR A VEHICLE

(75) Inventors: Jason M. Lewandowski, Stevens Point, WI (US); Chad D. Sullivan, Wisconsin Rapids, WI (US)

(73) Assignee: L&P Property Management Company, South Gate, CA (US)

(21) Appl. No.: 13/412,950

(22) Filed: Mar. 6, 2012

Related U.S. Patent Documents

Reissue of:
(64) Patent No.: 8,098,488
Issued: Jan. 17, 2012
Appl. No.: 13/024,038
Filed: Feb. 9, 2011

U.S. Applications:
(63) Continuation of application No. 12/395,140, filed on Feb. 27, 2009, now Pat. No. 7,978,466.

(60) Provisional application No. 61/031,775, filed on Feb. 27, 2008.

(51) Int. Cl.
*G06F 1/16* (2006.01)
*H05K 5/00* (2006.01)
*H05K 7/00* (2006.01)

(52) U.S. Cl. ..... 361/679.4; 439/374

(58) Field of Classification Search ..... 361/679.01, 361/679.02, 679.4–679.45, 679.55; 439/374; 710/303

See application file for complete search history.

(56) References Cited

U.S. PATENT DOCUMENTS 4,050,781 A 9/1977 Beauhaire
4,659,159 A 4/1987 Takahashi
4,718,858 A 1/1988 Godfrey et al.
4,743,715 A 5/1988 Gerbert-Gaillard et al.
4,833,554 A 5/1989 Dalziel et al.
5,030,128 A 7/1991 Herron et al.
5,175,671 A 12/1992 Sasaki
5,182,698 A 1/1993 Kobayashi et al.

(Continued)

FOREIGN PATENT DOCUMENTS

JP 7-94876 4/1995

(Continued)

OTHER PUBLICATIONS

2000 Solutions Manual, Gamber-Johnson LLC, pp. 37, 49, 76-77 (2000).

(Continued)

*Primary Examiner* — Adrian S Wilson
(74) *Attorney, Agent, or Firm* — Michael Best & Friedrich LLP

(57) ABSTRACT

A computer docking station for supporting and electrically coupling to a portable computer that has a docking connector includes a body having a support portion configured to support the portable computer, and a main connector moveable relative to the body between an engaged position in which the main connector is engageable with the docking connector, and a disengaged position. The computer docking station also includes a frame coupled to the body and the main connector. The frame is movable relative to the body between a first position, in which the main connector is in the disengaged position, and a second position, in which the main connector is in the engaged position. The computer docking station further includes a subframe coupled to the frame. The subframe is movable with the frame from the first position to the second position and is movable relative to the frame from the second position to a third position to inhibit movement of the main connector away from the engaged position.

33 Claims, 10 Drawing Sheets

U.S. PATENT DOCUMENTS

| | | | |
|---|---|---|---|
| 5,186,646 | A | 2/1993 | Pederson |
| 5,290,178 | A | 3/1994 | Ma |
| 5,384,686 | A | 1/1995 | Mesfin et al. |
| D356,782 | S | 3/1995 | Leman |
| 5,450,271 | A | 9/1995 | Fukushima et al. |
| 5,461,546 | A | 10/1995 | Kobayashi et al. |
| 5,477,415 | A | 12/1995 | Mitcham et al. |
| 5,488,572 | A | 1/1996 | Belmont |
| 5,535,093 | A | 7/1996 | Noguchi et al. |
| 5,552,959 | A | 9/1996 | Penniman et al. |
| 5,555,491 | A | 9/1996 | Tao |
| 5,557,562 | A | 9/1996 | Yoshiharu et al. |
| 5,568,359 | A | 10/1996 | Cavello et al. |
| 5,569,052 | A | 10/1996 | Belt et al. |
| 5,592,362 | A | 1/1997 | Ohgami et al. |
| 5,594,622 | A | 1/1997 | Hosoya et al. |
| 5,595,074 | A | 1/1997 | Munro |
| 5,604,663 | A | 2/1997 | Shin et al. |
| D378,676 | S | 4/1997 | Goodman et al. |
| 5,619,398 | A | 4/1997 | Harrison et al. |
| 5,633,782 | A | 5/1997 | Goodman et al. |
| 5,664,950 | A | 9/1997 | Lawrence |
| 5,689,654 | A | 11/1997 | Kikinis et al. |
| 5,694,292 | A | 12/1997 | Paulsel et al. |
| 5,704,212 | A | 1/1998 | Erler et al. |
| D393,451 | S | 4/1998 | Faranda et al. |
| 5,737,541 | A | 4/1998 | Shimizu et al. |
| 5,738,537 | A | 4/1998 | Setoguchi et al. |
| D395,640 | S | 6/1998 | Goodman et al. |
| 5,765,933 | A | 6/1998 | Paul et al. |
| 5,768,101 | A | 6/1998 | Cheng |
| 5,784,253 | A | 7/1998 | Ooka et al. |
| 5,790,375 | A | 8/1998 | Lee |
| 5,808,860 | A | 9/1998 | Ohgami et al. |
| 5,818,691 | A | 10/1998 | McMahan et al. |
| 5,822,185 | A | 10/1998 | Cavello |
| 5,822,546 | A | 10/1998 | George |
| 5,838,541 | A | 11/1998 | Mesfin et al. |
| 5,847,922 | A | 12/1998 | Smith et al. |
| 5,862,036 | A | 1/1999 | Lin |
| 5,864,294 | A | 1/1999 | Hsu et al. |
| 5,870,283 | A | 2/1999 | Maeda et al. |
| 5,882,220 | A | 3/1999 | Horii et al. |
| D412,162 | S | 7/1999 | Tal et al. |
| 5,926,627 | A | 7/1999 | Sugimura |
| 5,928,017 | A | 7/1999 | Lan |
| 5,933,322 | A | 8/1999 | Ruch et al. |
| 5,946,186 | A | 8/1999 | Karl et al. |
| D415,740 | S | 10/1999 | Lee et al. |
| 5,969,939 | A | 10/1999 | Moss et al. |
| D416,547 | S | 11/1999 | Lee et al. |
| 5,989,044 | A | 11/1999 | Miyamoto |
| 5,991,838 | A | 11/1999 | Swindler et al. |
| 5,991,839 | A | 11/1999 | Ninomiya |
| 5,995,366 | A | 11/1999 | Howell et al. |
| 6,015,309 | A | 1/2000 | Nakamura et al. |
| D420,651 | S | 2/2000 | Lee et al. |
| 6,034,869 | A | 3/2000 | Lin |
| 6,047,572 | A | 4/2000 | Bliven et al. |
| 6,049,454 | A | 4/2000 | Howell et al. |
| 6,061,233 | A | 5/2000 | Jung |
| 6,061,234 | A | 5/2000 | Broder et al. |
| 6,069,790 | A | 5/2000 | Howell et al. |
| 6,088,620 | A | 7/2000 | Ninomiya et al. |
| 6,101,087 | A | 8/2000 | Sutton et al. |
| 6,115,245 | A | 9/2000 | Ruch et al. |
| 6,164,611 | A | 12/2000 | Kuhnke |
| 6,185,095 | B1 | 2/2001 | Helot et al. |
| 6,188,572 | B1 | 2/2001 | Liao et al. |
| 6,189,349 | B1 | 2/2001 | Helot et al. |
| 6,202,008 | B1 | 3/2001 | Beckert et al. |
| 6,219,233 | B1 | 4/2001 | Moore et al. |
| 6,236,571 | B1 | 5/2001 | Dohi et al. |
| 6,256,194 | B1 | 7/2001 | Choi et al. |
| 6,259,601 | B1 | 7/2001 | Jaggers et al. |
| 6,275,378 | B1 | 8/2001 | Lee et al. |
| 6,275,945 | B1 | 8/2001 | Tsuji et al. |
| 6,280,212 | B1 | 8/2001 | Nguyen et al. |
| 6,319,034 | B1 | 11/2001 | Takakura et al. |
| 6,331,934 | B1 | 12/2001 | Helot et al. |
| 6,362,959 | B2 | 3/2002 | Tracy |
| 6,373,693 | B1 | 4/2002 | Seto et al. |
| 6,407,914 | B1 | 6/2002 | Helot |
| 6,407,915 | B1 | 6/2002 | Derocher et al. |
| 6,418,013 | B1 | 7/2002 | Broder et al. |
| 6,453,378 | B1 | 9/2002 | Olson et al. |
| 6,480,376 | B1 | 11/2002 | Nguyen et al. |
| 6,501,646 | B2 | 12/2002 | Suzuki |
| 6,504,710 | B2 | 1/2003 | Sutton et al. |
| 6,510,051 | B2 | 1/2003 | Kim |
| D470,849 | S | 2/2003 | Bertagnole et al. |
| 6,533,599 | B1 | 3/2003 | Singleton, Jr. |
| 6,549,416 | B2 | 4/2003 | Sterner et al. |
| 6,560,103 | B1 | 5/2003 | Dohi et al. |
| 6,563,699 | B1 | 5/2003 | Choi |
| 6,570,757 | B2 | 5/2003 | DiFonzo et al. |
| 6,574,102 | B2 | 6/2003 | Usui et al. |
| 6,581,420 | B1 | 6/2003 | Ling et al. |
| 6,583,984 | B2 | 6/2003 | Yin et al. |
| 6,583,985 | B2 | 6/2003 | Nguyen et al. |
| 6,585,212 | B2 | 7/2003 | Carnevali |
| 6,594,146 | B2 | 7/2003 | Frangesch et al. |
| 6,606,243 | B2 | 8/2003 | Kamimaki et al. |
| 6,654,234 | B2 | 11/2003 | Landry et al. |
| 6,659,516 | B2 | 12/2003 | Wang et al. |
| 6,667,881 | B2 | 12/2003 | Oross et al. |
| D486,492 | S | 2/2004 | Sheu et al. |
| 6,697,252 | B2 | 2/2004 | Maeda |
| D487,897 | S | 3/2004 | Huang et al. |
| 6,711,012 | B1 | 3/2004 | Medin et al. |
| 6,724,623 | B2 | 4/2004 | Bovio et al. |
| 6,741,463 | B1 | 5/2004 | Akhtar et al. |
| 6,754,070 | B2 | 6/2004 | Chen |
| 6,788,528 | B2 | 9/2004 | Enners et al. |
| 6,817,587 | B2 | 11/2004 | Lin |
| 6,833,988 | B2 | 12/2004 | Kamphuis et al. |
| 6,856,506 | B2 | 2/2005 | Doherty et al. |
| 6,869,304 | B2 | 3/2005 | Groebe et al. |
| 6,873,524 | B2 | 3/2005 | Kaczeus, Sr. et al. |
| 6,885,552 | B2 | 4/2005 | Mullen et al. |
| 6,898,079 | B2 | 5/2005 | Park |
| 6,902,089 | B2 | 6/2005 | Carnevali |
| 6,912,125 | B2 | 6/2005 | Weng |
| 6,934,151 | B2 | 8/2005 | Nakano et al. |
| 6,935,597 | B2 | 8/2005 | Shibuya |
| 6,950,302 | B2 | 9/2005 | Hubbard |
| 6,952,343 | B2 | 10/2005 | Sato |
| 6,961,237 | B2 | 11/2005 | Dickie |
| 7,009,840 | B2 | 3/2006 | Clark et al. |
| 7,016,181 | B2 | 3/2006 | Ito et al. |
| 7,017,243 | B2 | 3/2006 | Carnevali |
| 7,024,566 | B2 | 4/2006 | Shiwaku et al. |
| 7,032,872 | B2 | 4/2006 | Sullivan |
| D521,001 | S | 5/2006 | Xiao et al. |
| 7,038,908 | B2 | 5/2006 | Usui et al. |
| 7,054,154 | B2 | 5/2006 | Mullen et al. |
| 7,079,385 | B1 | 7/2006 | Cheng et al. |
| 7,085,132 | B2 | 8/2006 | Schlesener et al. |
| 7,110,252 | B2 | 9/2006 | Liang et al. |
| 7,113,395 | B2 | 9/2006 | Hara et al. |
| 7,180,735 | B2 | 2/2007 | Thomas et al. |
| 7,236,863 | B2 | 6/2007 | LaPorte et al. |
| 7,242,574 | B2 | 7/2007 | Sullivan |
| D548,235 | S | 8/2007 | Krieger et al. |
| 7,273,203 | B2 | 9/2007 | Carnevali |
| 7,274,565 | B2 | 9/2007 | Kamimaki et al. |
| 7,283,357 | B2 | 10/2007 | Kim |
| 7,286,344 | B2 | 10/2007 | Kim |
| 7,298,611 | B1 | 11/2007 | Carnevali |
| D557,207 | S | 12/2007 | Aguilar |
| 7,306,386 | B2 | 12/2007 | Lyman et al. |
| 7,315,453 | B1 | 1/2008 | Carnevali |
| 7,339,795 | B2 | 3/2008 | Hsu |
| 7,345,871 | B2 | 3/2008 | Lev et al. |
| 7,381,079 | B2 | 6/2008 | Chuang |
| 7,386,868 | B2 | 6/2008 | McCormack |
| 7,405,942 | B1 | 7/2008 | Lewis |

| | | | |
|---|---|---|---|
| 7,417,855 | B2 | 8/2008 | Carnevali |
| 7,426,108 | B2 | 9/2008 | Carnevali |
| 7,440,275 | B2 | 10/2008 | Schedivy |
| 7,445,479 | B2 | 11/2008 | Fan et al. |
| D585,897 | S | 2/2009 | Carnevali |
| 7,505,265 | B2 | 3/2009 | Nishiyama |
| 7,508,658 | B2 | 3/2009 | Ling |
| 7,508,661 | B2 | 3/2009 | Carnevali |
| 7,511,954 | B2 | 3/2009 | Tsai et al. |
| 7,571,522 | B2 | 8/2009 | Carnevali |
| 7,573,706 | B2 | 8/2009 | Carnevali |
| 7,583,495 | B2 | 9/2009 | Carnevali |
| 7,621,766 | B2 | 11/2009 | Schütz |
| 7,633,750 | B2 | 12/2009 | Fan et al. |
| 2003/0218113 | A1 | 11/2003 | Sullivan |
| 2004/0177658 | A1 | 9/2004 | Mitchell |
| 2004/0262489 | A1 | 12/2004 | Joseph et al. |
| 2006/0026326 | A1 | 2/2006 | Hunt et al. |
| 2006/0192070 | A1 | 8/2006 | Chan |
| 2006/0221565 | A1 | 10/2006 | Doherty et al. |
| 2007/0153446 | A1 | 7/2007 | Newman et al. |
| 2008/0002354 | A1 | 1/2008 | Carnevali |
| 2008/0002369 | A1 | 1/2008 | Carnevali |
| 2008/0003860 | A1 | 1/2008 | Carnevali |
| 2008/0216179 | A1 | 9/2008 | Hall |
| 2008/0270664 | A1 | 10/2008 | Carnevali |
| 2008/0296821 | A1 | 12/2008 | Carnevali |
| 2009/0212189 | A1 | 8/2009 | Carnevali |

FOREIGN PATENT DOCUMENTS

| | | |
|---|---|---|
| JP | 09-305264 | 11/1997 |
| JP | 2001-67141 | 3/2001 |

OTHER PUBLICATIONS

2001 Solutions Manual, Gamber-Johnson LLC, p. 47 (2001).
2002 Solutions Manual, Gamber-Johnson LLC, pp. 8-9, 42, 44 (2002).
2003 Solutions Manual, Gamber-Johnson LLC, p. 37 (2003).
2004 Mobile Data Mounting Catalog, Kodiak Mobile Mfg. Inc., pp. 1-16, Accessed From www.publicsafety911.com (2004).
2004 Solutions Manual, Gamber-Johnson LLC, pp. 36-37, 40-42, 44 (2004).
2005 Solutions Manual, Gamber-Johnson LLC, pp. 37, 44-45 (2005).
2006 Mounting Solutions Manual, Gamber-Johnson LLC, pp. 23-24 (2006).
2007 Mounting Solutions Catalog, Gamber-Johnson LLC, pp. 28-47 (2007).
Dual Axis Docking Station, Accessed From www.precisionmounts.com (available as early as Jul. 2004).
"Inside or Out RAM's Your Electronic Mount" Electrical Products and Solutions, pp. 22, 24-26, 28, 30, 32 (May 2006).
Installation Instructions ML850 Docking Cradle Installation Guide, Gamber-Johnson LLC (Feb. 15, 2006).
Installation Instructions ML900 Docking Cradle Installation Guide, Gamber-Johnson LLC (Feb. 15, 2006).
Installation Instructions ML900 Docking Stations, Gamber-Johnson LLC (May 1, 2007).
Ledco CF29 TuffDock, Accessed From www.ledco.net (available as early as Nov. 2005).
Ledco CFX Docking Stations, Accessed From www.ledco.net (available as early as Jul. 2007).
Panasonic CF-29 Docking Station, Gamber-Johnson LLC (available as early as Nov. 2004).
Panasonic CF-30 Vehicle Mount Port Replicator, Accessed From www.panasonic.com.au (available as early as Jul. 2007).
Panasonic Toughbook 28 Docking Station, Catalog Page from Gamber-Johnson LLC (available as early as 2002).
Precision Mounting Technologies CF27/28 (photographs) (available as early as Oct. 18, 2001).
"RAM Mounting Laptop Accessories" Civil Infrastructure, p. 8 (Jan. 2004).
"RAM No-drill Systems" Utility Products, pp. 6, 8, 10, 12 (Mar. 2006).
Ram Tough Dock, Accessed From www.ram-mount.com (available as early as Jan. 2007).
Photographs of interlock mechanism of prior art Ledco brand docking station in public use or on sale at least as early as Feb. 26, 2007.
2000 Solutions Manual, Gamber-Johnson LLC, pp. 37, 49, 76-77.
2001 Solutions Manual, Gamber-Johnson LLC, p. 47.
2002 Solutions Manual, Gamber-Johnson LLC, pp. 8-9, 42, 44.
2003 Solutions Manual, Gamber-Johnson LLC, p. 37.
2004 Mobile Data Mounting Catalog, Kodiak Mobile Mfg. Inc., pp. 1-16, Accessed From www.publicsafety911.com.
2004 Solutions Manual, Gamber-Johnson LLC, pp. 36-37, 40-42, 44.
2005 Solutions Manual, Gamber-Johnson LLC, pp. 37, 44-45.
2006 Mounting Solutions Manual, Gamber-Johnson LLC, pp. 23-24.
2007 Mounting Solutions Catalog, Gamber-Johnson LLC, pp. 28-47.
Ledco CFX Docking Station, Accessed From www.ledco.net (available as early as Jul. 2007).

COMPUTER DOCKING STATION FOR A VEHICLE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a *reissue of U.S. patent application Ser. No. 13/024,038, filed Feb. 9, 2011, now U.S. Pat. No. 8,098,488, which is a* continuation of U.S. patent application Ser. No. 12/395,140, filed Feb. 27, 2009, [and published as U.S. Publication No. 2009/0213536 on Aug. 27, 2009] *now U.S. Pat. No. 7,978,466*, which claims priority to U.S. Provisional Patent Application No. 61/031,775, filed Feb. 27, 2008, the entire contents of each of the foregoing are incorporated herein by reference.

BACKGROUND

The present invention relates to computer docking stations and, more particularly, to computer docking stations for use in vehicles.

It is becoming common to outfit some vehicles (e.g., squad cars, fire trucks, ambulances, or the like) with portable computers such as, for example, laptops. Such computers allow drivers or other passengers within the vehicles to access information that was previously unavailable or difficult to retrieve. Typically, these vehicles are fitted with docking stations to which the computers may be securely connected or "docked" when in use.

SUMMARY

In one embodiment, a computer docking station for supporting and electrically coupling to a portable computer that has a docking connector includes a body having a support portion configured to support the portable computer, and a main connector moveable relative to the body between an engaged position in which the main connector is engageable with the docking connector and a disengaged position. The computer docking station also includes a frame coupled to the body and the main connector. The frame is movable relative to the body between a first position, in which the main connector is in the disengaged position, and a second position, in which the main connector is in the engaged position. The computer docking station further includes a subframe coupled to the frame. The subframe is movable with the frame from the first position to the second position and is movable relative to the frame from the second position to a third position to inhibit movement of the main connector away from the engaged position.

In another embodiment, the computer docking station includes a body having a support portion that defines a support surface configured to support the portable computer, and a main connector moveably coupled to the body for movement between an engaged position in which at least a portion of the main connector is positioned above the support surface and a disengaged position. The computer docking station also includes a frame coupled to the body and the main connector. The frame is movable relative to the body between a first position, in which the main connector is in the disengaged position, and a second position, in which the main connector is in the engaged position. The computer docking station further includes an interlock having a first end portion coupled to the body and a second end portion substantially opposite the first end portion and movable relative to the body. The second end portion engages the frame to inhibit movement of the frame from the first position to the second position. The interlock also includes a projection extending through the support surface of the body. The projection is configured to be actuated by the portable computer when the portable computer is positioned on the support surface to move the second end portion out of engagement with the frame.

In yet another embodiment, the computer docking station includes a body having a support portion configured to support the portable computer, and a main connector moveable with respect to the body between an engaged position in which at least a portion of the main connector is positioned above the support portion and a disengaged position. The computer docking station also includes a frame coupled to the body and the main connector. The frame is movable generally linearly relative to the body between a first position, in which the main connector is in the disengaged position, and a second position, in which the main connector is in the engaged position. The frame defines a notch formed along an edge of the frame. The computer docking station further includes a subframe carried by and movable with the frame between the first position and the second position and movable generally linearly relative to the frame from the second position to a third position, and a first biasing member coupled between the frame and the subframe. The subframe is moved from the second position to the third position against a bias of the first biasing member. The first biasing member biases the frame toward the subframe to resist movement of the main connector away from the engaged position when the subframe is in the third position. The computer docking station also includes a second biasing member coupled between the body and the frame. The second biasing member biases the frame toward the first position. The first biasing member is stiffer than the second biasing member. The computer docking station further includes an interlock having a first end portion coupled to the body and a second end portion substantially opposite the first end portion and movable relative to the body. The second end portion fits within the notch in the frame to inhibit movement of the frame from the first position to the second position. The interlock also includes a projection extending through the support portion of the body. The projection is configured to be actuated by the portable computer when the portable computer is positioned on the support portion to move the second end portion out of the notch in the frame.

Other aspects of the invention will become apparent by consideration of the detailed description and accompanying drawings.

Figure 1:
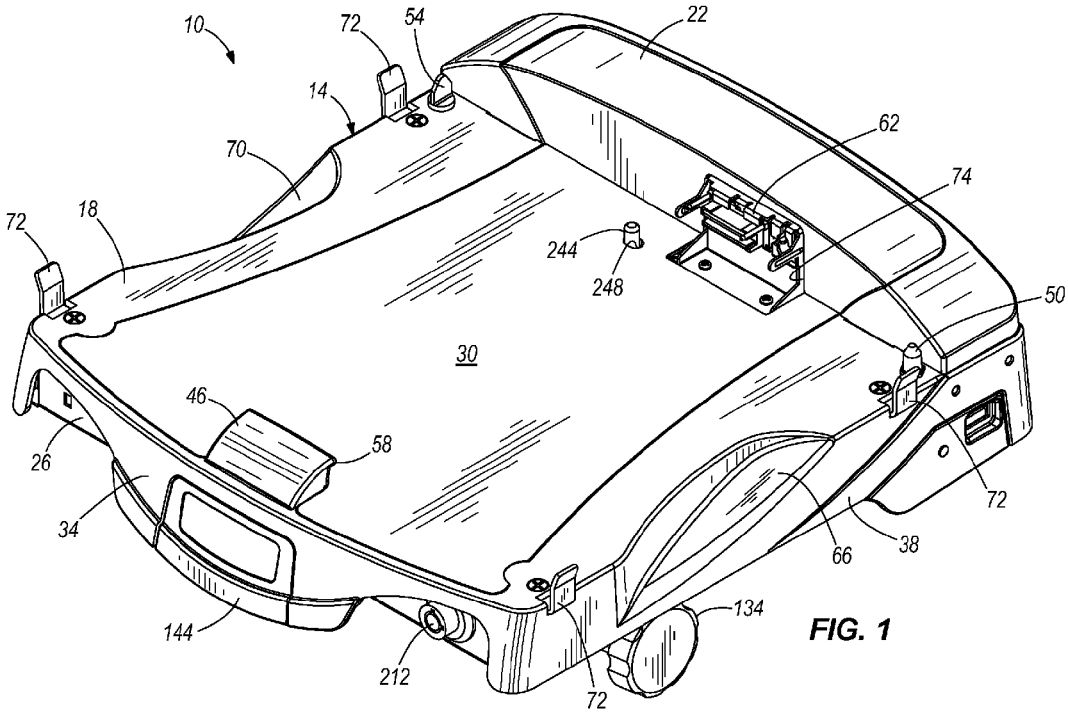
FIG. 1 is a top perspective view of a docking station.

It is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

FIGS. 1 to 4 illustrate a docking station 10 embodying the invention. The docking station 10 is mountable within a vehicle (e.g., a squad car, a fire truck, an ambulance, or the like) and supports a portable computer (e.g., a laptop or the like). In the illustrated embodiment, the docking station 10 can be mounted to the vehicle such that a portable computer connected to the docking station 10 is positioned between the driver's seat and the front passenger's seat. In other embodiments, the docking station 10 may be mounted in other locations to position the computer elsewhere in the vehicle.

The illustrated docking station 10 includes a body 14 having an upper support portion 18, a back portion 22, and a lower portion 26. In the illustrated embodiment, the support portion 18 is die cast as a single piece from a magnesium or aluminum based alloy, the back portion 22 is an injection molded component (e.g., of plastic), and the lower portion 26 is fabricated as a single piece from sheet stock. In other embodiments, the back portion 22 and/or the lower portion 26 may be die cast with the support portion 18 as a single piece or as separate pieces. In other embodiments, each of the portions 18, 22, 26 may be formed using entirely different materials and/or manufacturing techniques.

Figure 3:
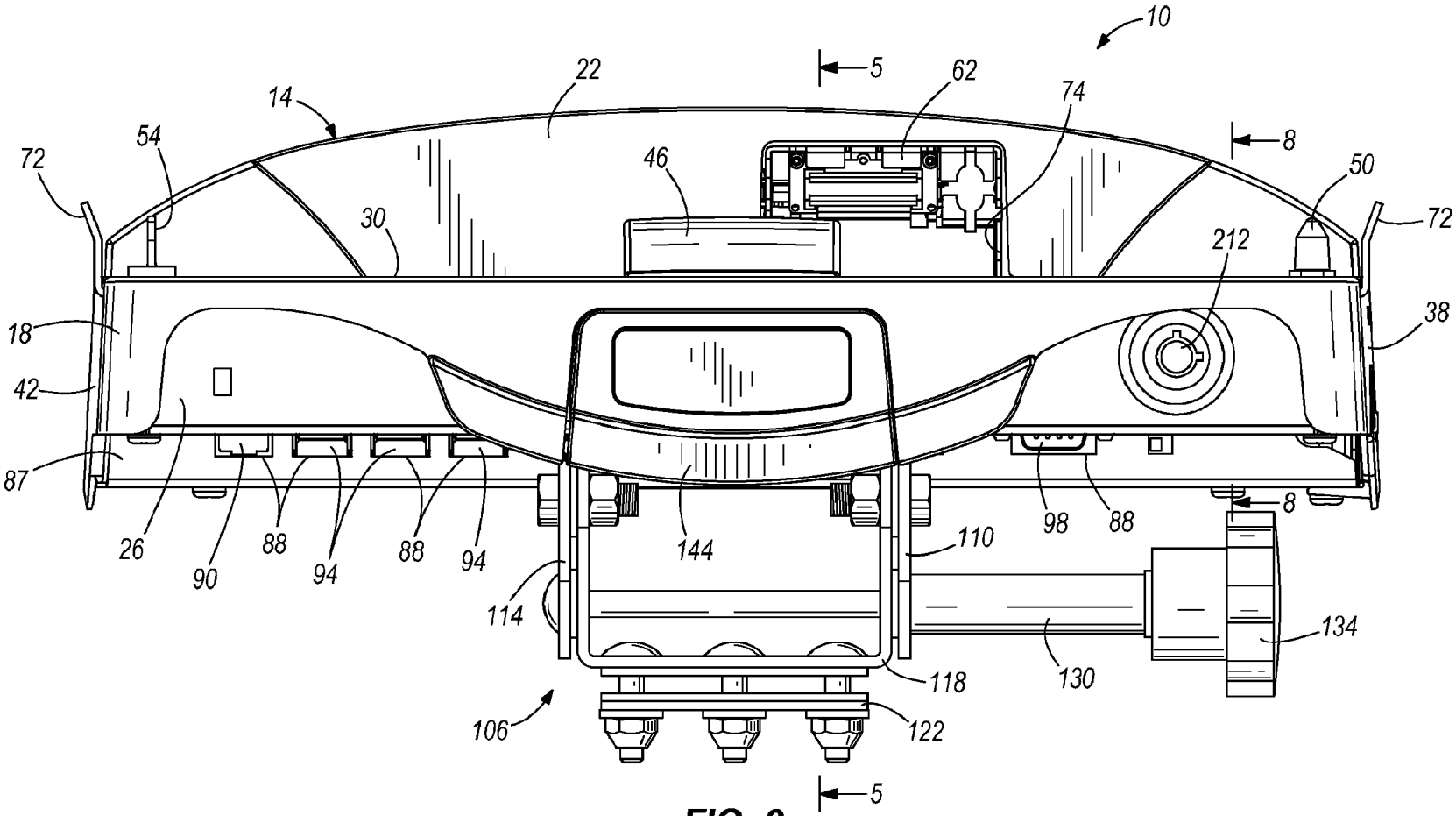
FIG. 3 is a front view of the docking station of FIG. 1.

The support portion 18 defines a generally flat top or support surface 30, a front surface 34, and two side surfaces 38, 42. As shown in FIGS. 1 and 3, a flange 46 extends upwardly from the top surface 30 proximate to the front surface 34 and two studs 50, 54 extend upwardly from the top surface 30 proximate to the back portion 22. The flange 46 includes a lip 58 that fits over a front of the portable computer, while the studs 50, 54 fit within corresponding holes or apertures in a bottom of the computer when the computer is positioned on the top surface 30. The flange 46 and the studs 50, 54 engage the computer to reduce or inhibit shifting or sliding of the computer relative to the top surface 30. The flange 46 and the studs 50, 54 also help properly align the portable computer on the support portion 18 for connecting or interfacing with a main docking connector 62. Two recesses or cut-out sections 66, 70 are formed in the support portion 18 between the top surface 30 and the side surfaces 38, 42 and provide spaces for a person's hands to grasp the sides of the computer when placing the computer on the support surface 30 or lifting the computer off the support surface 30. As shown in FIG. 1, four guides 72 are coupled to the body 14 along edges defined between the top surface 30 and the side surfaces 38, 42 to also help position and retain the computer on the support portion 18.

Figure 4:
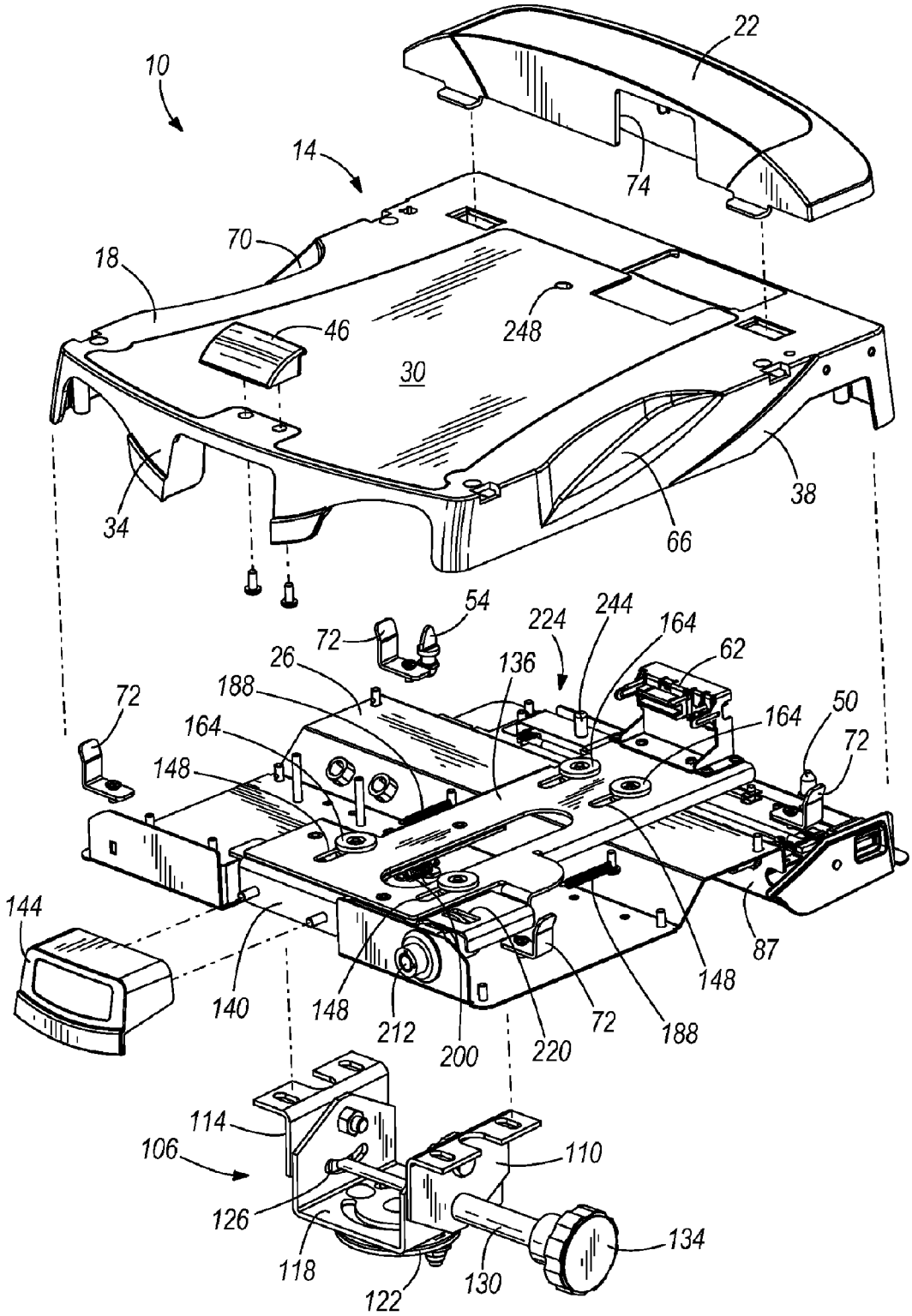
FIG. 4 is an exploded perspective view of the docking station of FIG. 1.

The back portion 22 is coupled (e.g., bolted and/or snap-fit) to the support portion 18 and extends upwardly from the top surface 30. The illustrated back portion 22 defines a backstop for the portable computer to abut against such that the computer is retained between the back portion 22 and the flange 46. As shown in FIGS. 1, 3, and 4, the back portion 22 defines an opening 74 through which the main connector 62 extends for connection with the computer, as further described below.

Figure 5:
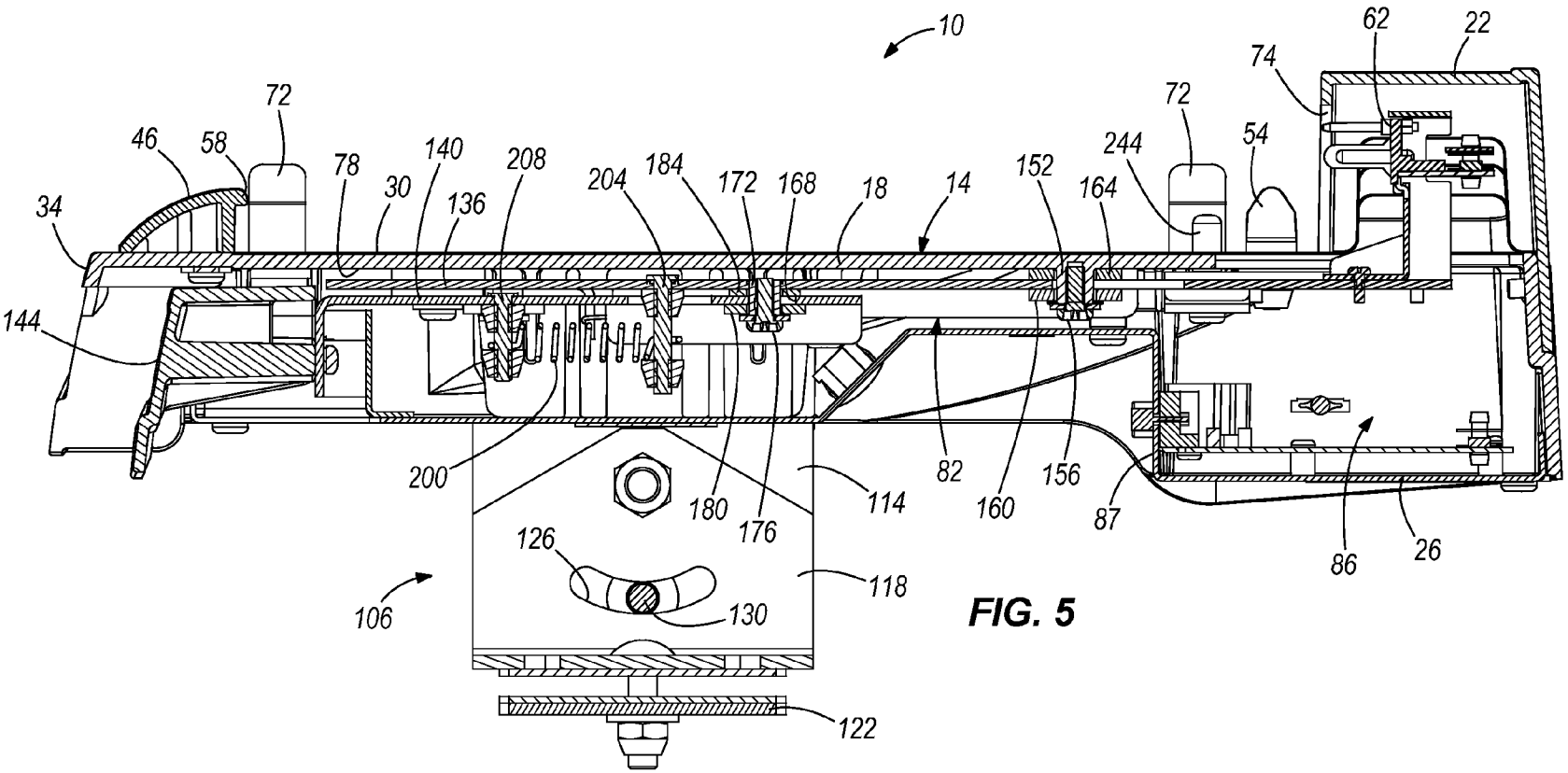
FIG. 5 is a cross-sectional view of the docking station taken along section line 5-5 of FIG. 3, and illustrating a handle in a first recessed position and a main connector in a disengaged position.
Figure 6:
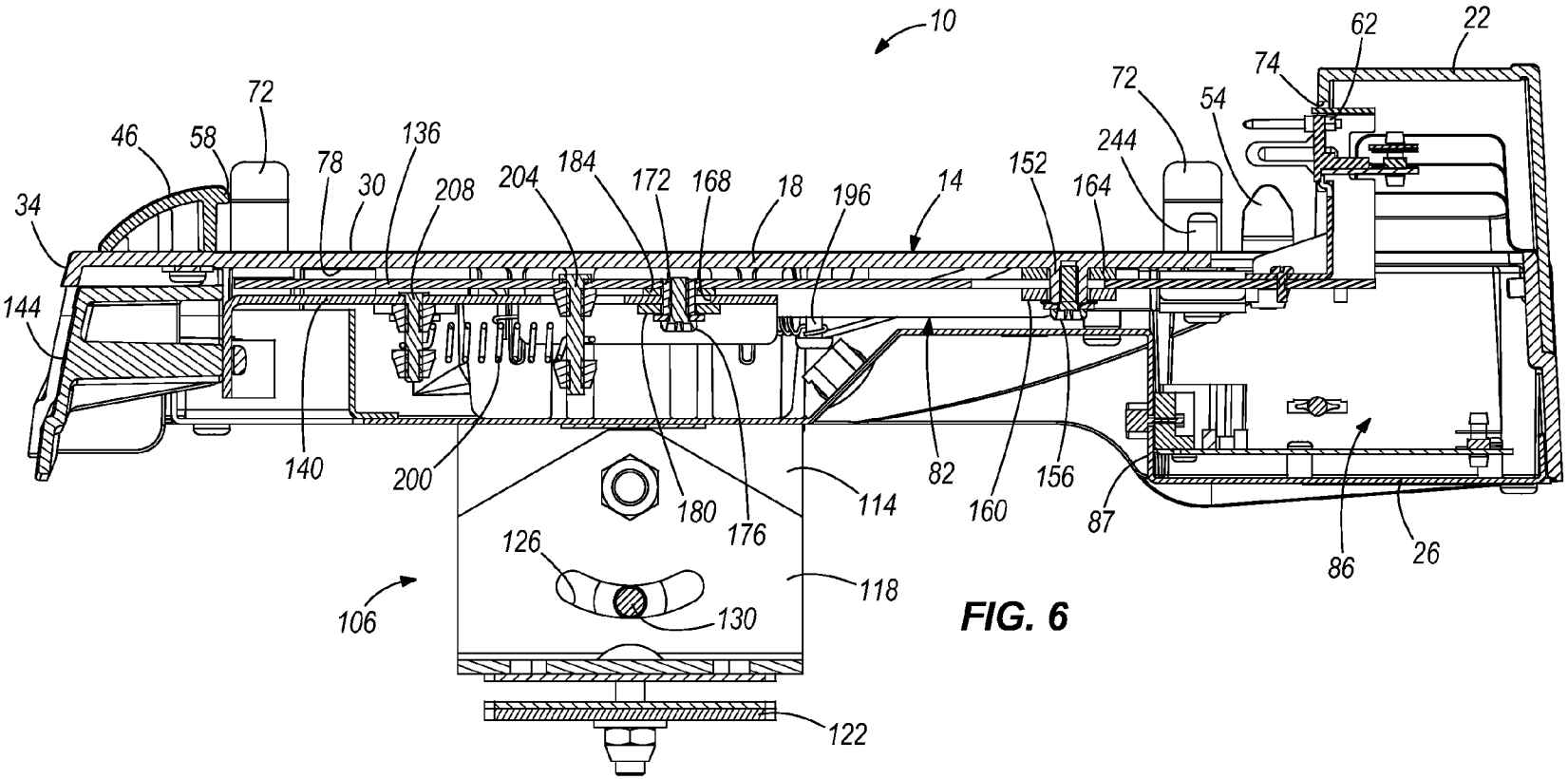
FIG. 6 is the cross-sectional view of the docking station of FIG. 5 illustrating the handle in a second recessed position and the main connector in an engaged position.
Figure 7:
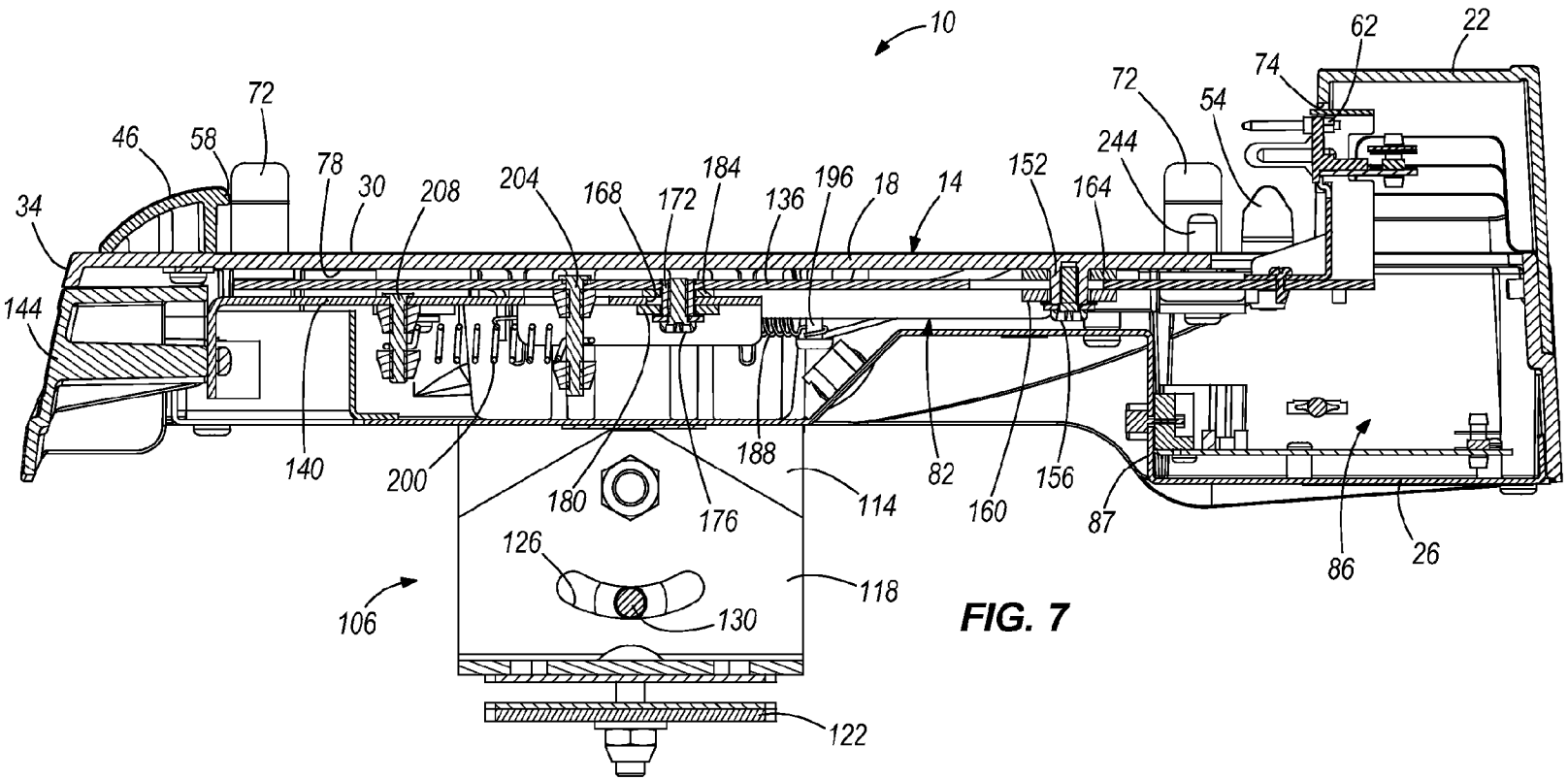
FIG. 7 is the cross-sectional view of the docking station of FIG. 5 illustrating the handle in an extended position and the main connector in the engaged position.

Referring also to FIGS. 5 to 7, the lower portion 26 is coupled (e.g., screwed, bolted, or snap-fit) to the support portion 18. The lower portion 26 generally fits within and is substantially surrounded or enveloped by the top surface 30, the front surface 34, and the side surfaces 38, 42 of the support portion 18. The lower portion 26 and the support portion 18 cooperate to define a chamber 82. The lower portion 26 includes a rear compartment 86 that receives and houses a plurality of peripheral connectors. A wall 87 of the lower portion 26 defines a plurality of apertures 88 that communicate with the rear compartment 86 and provide access for coupling with the plurality of connectors. In the illustrated embodiment, the peripheral connectors (FIG. 2) include, for example, a network jack 90, universal serial bus (USB) ports 94, serial ports 98, and cable jacks 102. In other embodiments, fewer or more and/or different peripheral connectors may be positioned within the rear compartment 86 of the lower portion 26. In some embodiments, one or more peripheral connectors may also be positioned on the front surface 34 and/or the side surfaces 38, 42 of the support portion 18 for easier accessibility. The peripheral connectors are electrically coupled to the main connector 62 to facilitate coupling peripheral components (e.g., a power supply, network connection, mouse, data stick, PDA, printer, camera, etc.) to the computer.

Figure 2:
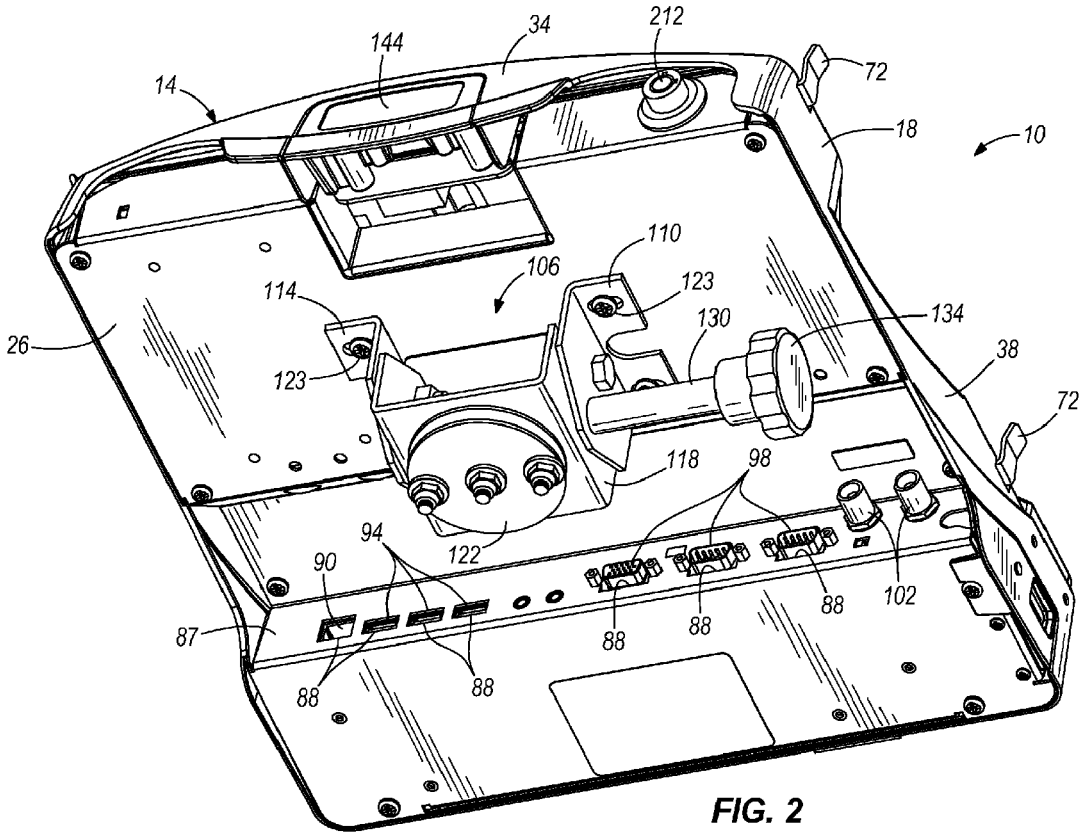
FIG. 2 is a bottom perspective view of the docking station of FIG. 1.

As shown in FIG. 2, a mounting apparatus 106 is coupled (e.g., screwed or bolted) to the body 14 for mounting the docking station 10 in the vehicle. The illustrated mounting apparatus 106 allows the docking station 10 to tilt and rotate relative to the vehicle. In the illustrated embodiment, the mounting apparatus 106 includes two support brackets 110, 114 that extend downwardly from the lower portion 26, a tilt bracket 118 coupled to and extending between the support brackets 110, 114, and a swivel 122 coupled to the tilt bracket 118. The support brackets 110, 114 are spaced apart from each other and are coupled to the body 14 by extending fasteners 123 (e.g. screws) through apertures defined by the lower portion 26 and into threaded bores 124 (FIGS. 10 and 11) defined by mounting bosses 125 (FIGS. 10 and 11) that depend from an inner surface 78 of the support portion 18. Ends 127 of the mounting bosses 125 engage the lower portion 26 such that the mounting bosses 125 lend additional structural support to the central portion of the body 14. The tilt bracket 118 is positioned between the support brackets 110, 114 and includes two arcuate slots 126 (only one of which is shown in FIGS. 4 to 6) defining a tilt travel path of the docking station 10. The illustrated swivel 122 is configured for coupling to a stud or pedestal extending upwardly from the floor of the vehicle, a protrusion extending outwardly from the dashboard, or a portion of a center console, to mount the docking station 10 within the vehicle. In some embodiments, the swivel 122 includes a bearing to facilitate rotation of the docking station 10 relative to the vehicle.

Referring to FIGS. 2 and 3, a rod 130 extends through the support brackets 110, 114 and the arcuate slots 126 of the tilt bracket 118. A knob 134 is coupled to an end of the rod 130 to facilitate rotation of the rod 130. Rotating the knob 134 in one direction (e.g., clockwise in FIG. 2) draws the support brackets 110, 114 together, thereby tightening the support brackets 110, 114 about the tilt bracket 118 and substantially inhibiting tilting of the docking station 10 relative to the vehicle. Rotating the knob 134 in the other direction (e.g., counterclockwise in FIG. 2) allows the support brackets 110, 114 to separate, thereby releasing the tilt bracket 118 and allowing a user to tilt the docking station 10 relative to the vehicle.

As shown in FIGS. 5 to 7, in the illustrated construction the main connector 62 is positioned within the back portion 22 of the body 14 and is coupled to a frame 136 that extends through the chamber 82. A subframe 140 is coupled to a front portion of the frame 136 and supports a handle 144 for manually moving (e.g., linearly sliding) the main connector 62, the frame 136, and the subframe 140 relative to the body 14. In the illustrated embodiment, the frame 136 and the subframe 140 are slidably mounted to the inside of the support portion 18 for movement within the chamber 82. The frame 136 defines elongated slots 148 (FIGS. 10 and 11) that receive guide posts 152 extending from the inner surface 78 of the support portion 18. The slots 148 and the guide posts 152 cooperate to guide the frame 136 for substantially linear movement with respect to the body 14. Fasteners 156 extend into the guide posts 152 to couple washers 160 between the frame 136 and the fasteners 156. Washers 164 are also positioned between the inner surface 78 of the support portion 18 and the frame 136 to facilitate movement of the frame 136 relative to the body 14.

The subframe 140 defines a second set of elongated slots 168 (FIGS. 5-7) to movably couple the subframe 140 to the frame 136. The slots 168 receive fasteners 172 (e.g., bolts) extending into corresponding guide posts 176 coupled to the frame 136. Washers 180, 184 are positioned between the fasteners 172 and the subframe 140 and between the subframe 140 and the frame 136 to facilitate movement of the subframe 140 relative to the frame 136, as further described below.

In the illustrated embodiment, the main connector 62 is coupled to the frame 136 so that the main connector 62 and the frame 136 move together as a single unit (i.e., the frame 136 does not move relative to the main connector 62). In other embodiments, the main connector 62 may be coupled to the frame 136 by, for example, a linkage, a geared or belt and pulley connection, a cam-follower arrangement, or any combination of these or other suitable connections so that the main connector 62 moves along a desired path in response to movement of the frame 136. The illustrated main connector 62 is connected to or in communication with the peripheral connectors such that any input or device connected to the docking station 10 via the peripheral connectors (e.g., the network jack 90, universal serial bus (USB) ports 94, serial ports 98, and cable jacks 102) is also connected to a portable computer connected to the docking station 10 via the main connector 62.

The main connector 62 is movable between a first, or disengaged, position (FIG. 5) and a second, or engaged, position (FIGS. 6 and 7). As shown in FIG. 5, when in the disengaged position, the main connector 62 is recessed within the back portion 22 such that the main connector 62 is spaced away from a computer positioned on the support portion 18. As shown in FIGS. 6 and 7, when in the engaged position, the main connector 62 extends at least partially through the opening 74 and over the support portion 18 to connect or dock to a computer. Moving the frame 136 forwardly (i.e., away from the back portion 22) from a first position (FIG. 5) to a second position (FIGS. 6 and 7) moves (e.g., slides) the main connector 62 through the opening 74 from the disengaged position to the engaged position. In the illustrated embodiment, two biasing members 188 are coupled to tabs 192 formed on the frame 136 and posts 196 extending from the inner surface 78 of the support portion 18. The biasing members 188 bias the frame 136 toward the first position and, thereby, bias the main connector 62 toward the disengaged position. In the illustrated construction, the biasing members 188 are coil springs. In other constructions, the biasing members 188 may be other suitable spring-type elements and/or the docking station 10 may include fewer or more biasing members.

The subframe 140 is supported and carried by the frame 136 such that the subframe 140 moves with the frame 136 from the first position (FIG. 5) to the second position (FIG. 6). The subframe 140 is also movable relative to the frame 136 to a third, or extended, position (FIG. 7). As the frame 136 approaches the second position (FIG. 6) when a portable computer is positioned on the support surface 30, the main connector 62 engages and "bottoms out" in a corresponding receptacle in the portable computer, thereby limiting further movement of the frame 136 away from the back portion 22. The subframe 140 may then be moved (e.g., slid) relative to the frame 136 farther away from the back portion 22 to the third or extended position of FIG. 7.

Figure 10:
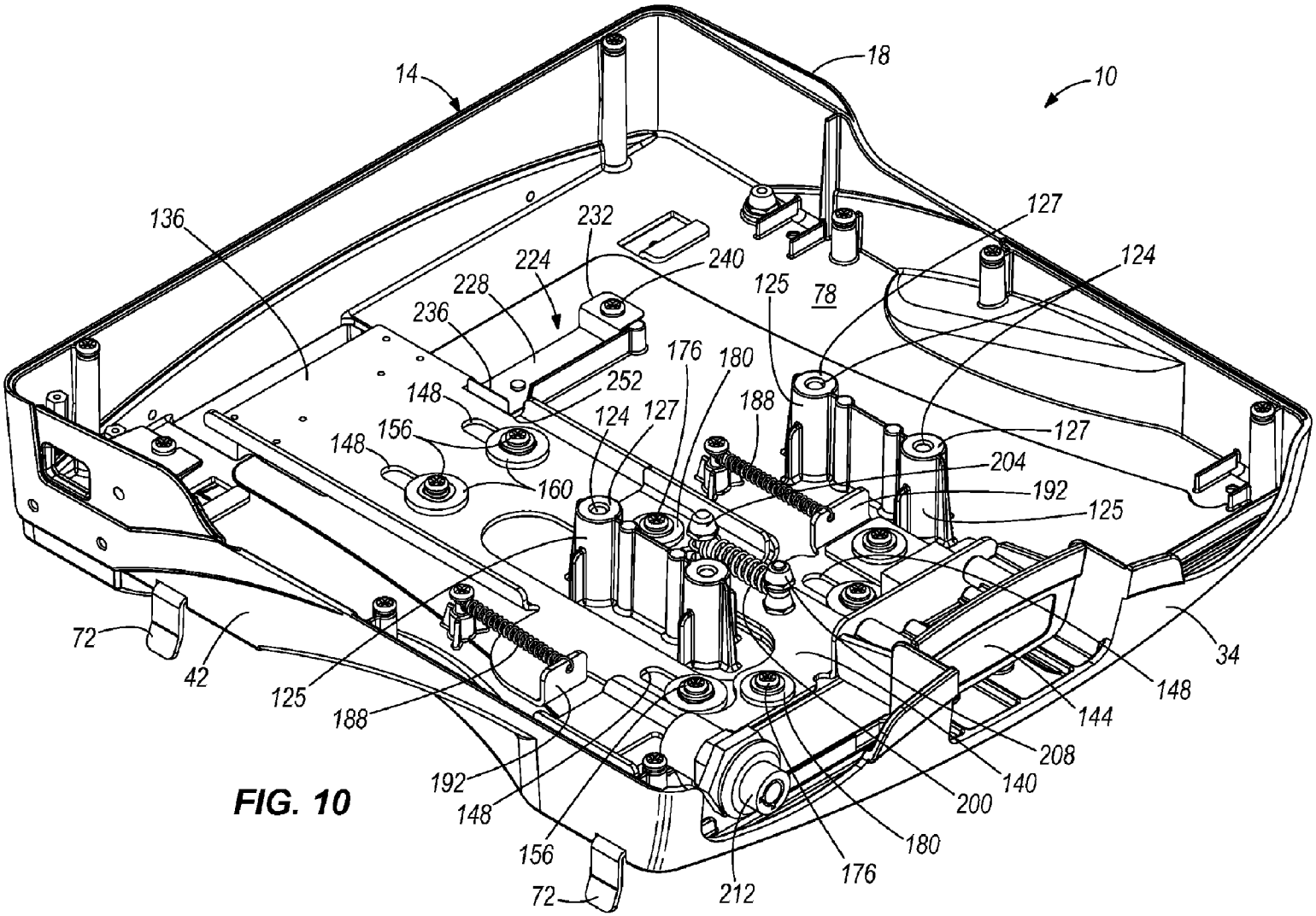
FIG. 10 is a bottom perspective view of the docking station of FIG. 1 illustrating an interlock in an engaged position.
Figure 11:
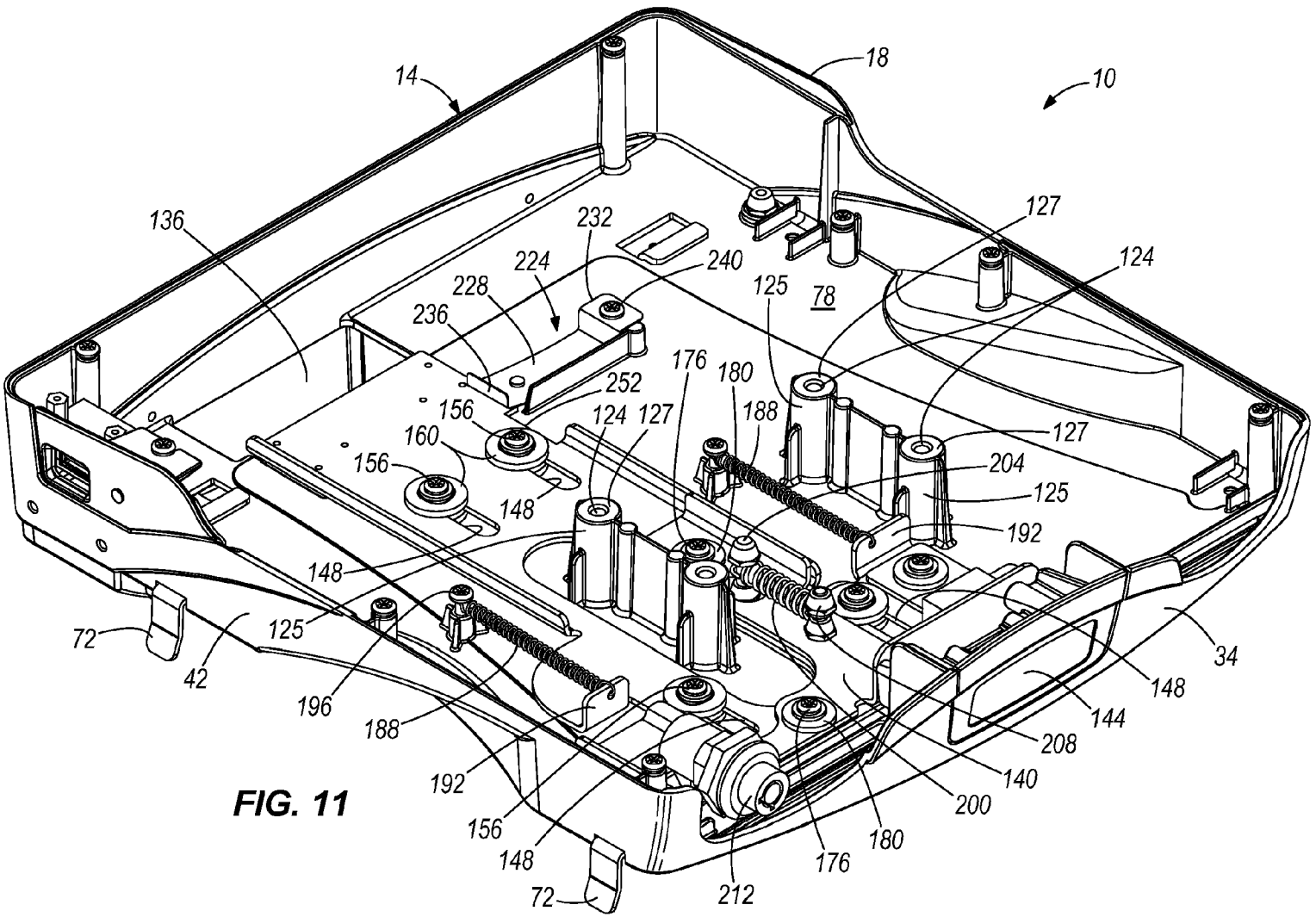
FIG. 11 is the bottom perspective view of the docking station of FIG. 10 illustrating the interlock in a disengaged position.

As shown in FIGS. 10 and 11, a biasing member 200 (e.g., a coil spring, etc.) is coupled between a boss 204 extending from the frame 136 and a boss 208 extending from the subframe 140 to bias the frame 136 and the subframe 140 generally toward one another. The illustrated biasing member 200 is generally stiffer (i.e., has a larger spring constant) than the combined stiffness of the biasing members 188 (or member 188 if only one biasing member 188 is used) such that, when the handle 144 is initially pulled away from the back portion 22, the main connector 62, the frame 136, and the subframe 140 move away from the first position together as a single unit. However, once the frame 136 is prevented from moving beyond the second position (FIG. 6) (e.g., by bottoming out in the receptacle of a portable computer), further pulling of the handle 144 moves the subframe 140 against the bias of the biasing member 200 to the third position (FIG. 7). This arrangement provides a more robust engagement between the main connector 62 and the portable computer by resisting movement of the main connector 62 away from the engaged position. That is, when the subframe 140 is in the third position, the biasing member 200 applies a biasing force to the frame 136 and the main connector 62 that biases the connector 62 into engagement with a portable computer, thereby reducing the likelihood that the connector 62 will become disengaged from the portable computer as a result of vibrations or other small movements. In addition, this arrangement can compensate for manufacturing variability associated with the production and assembly of the frame 136, the subframe 140, and the main connector 62.

The handle 144 is coupled (e.g., via fasteners, adhesives, molding, etc.) to the subframe 140 to facilitate movement of the subframe 140, the frame 136, and the main connector 62. As shown in FIGS. 5 and 6, when the frame 136 and subframe 140 are in the first and second positions, the handle 144 is recessed relative to the front surface 34 of the support portion 18. As shown in FIG. 7, when in the subframe is moved to the third position, the handle 144 is substantially flush with the front surface 34. Since the handle 144 is located within a periphery of the support portion 18 when in the first and second positions, and is flush with the front surface 34 of the support portion 18 when in the third, extended position, the number of components extending outwardly from the docking station 10 is limited, reducing the possibility of a user or foreign object catching or snagging on the docking station 10.

In other embodiments, the frame 136 and the subframe 140 may be manufactured as a single piece. In such embodiments, the main connector 62, the frame/subframe, and the handle 144 may all move together between a recessed position and an extended position to move the main connector 62 into and out of engagement with a portable computer.

In still other embodiments, the main connector 62 may be configured to engage the underside of a portable computer positioned on the top surface 30. In such cases, the support portion 18 defines an opening similar to the illustrated opening 74. When the frame 136 and the subframe 140 are in the recessed position, the main connector 62 is positioned within the support portion 18 and is not engaged with the computer. Moving the handle 144 forwardly to the second and third positions moves the main connector 62 generally upwardly through the opening in the support portion 18 for engagement with the computer. Movement of the main connector 62 in a direction different from the direction of movement of the handle 144 can be achieved using one or more of the alternative coupling mechanisms discussed above, including linkages, geared or belt and pulley connections, and cam-follower arrangements, among others. Whether the main connector 62 extends through an opening in the back portion 22 or the support portion 18 depends at least partially upon the type of computer the docking station 10 is configured to support. Some embodiments may include a pair of main connectors, one or both of which may extend through either the support portion 18 or the back portion 22.

Figure 8:
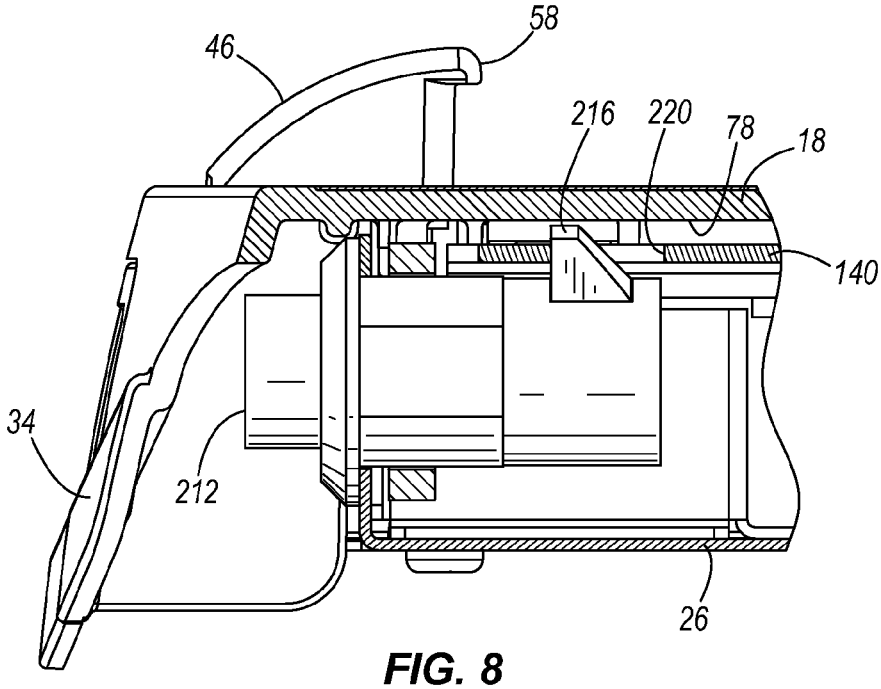
FIG. 8 is a partial cross-sectional view of the docking station taken along section line 8-8 of FIG. 3 and illustrating a release button and locking mechanism.
Figure 9:
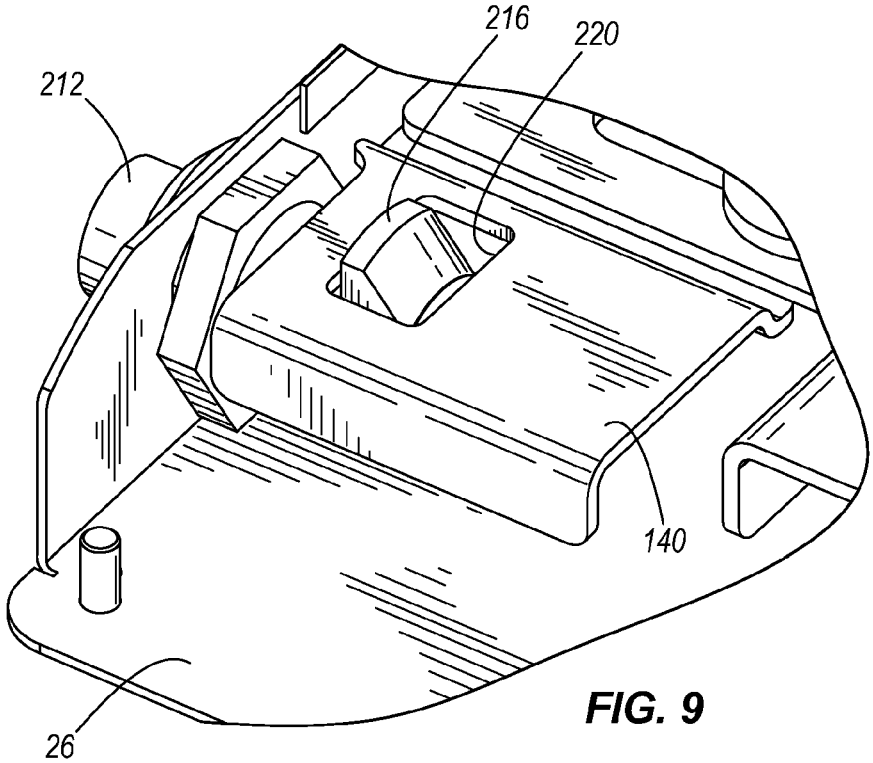
FIG. 9 is an enlarged perspective view of the release button and locking mechanism of FIG. 8.

Referring to FIGS. 8 and 9, in the illustrated embodiment, a release button 212 extends from the front surface of the lower portion 26 and releasably holds the subframe 140 in the third, or extended, position (FIG. 7). The release button 212 includes a projection 216, or cam member, that is received by a slot 220 in the subframe 140 when the subframe 140 is in the third or extended position. As the subframe 140 is moved forwardly toward the third position, the subframe rides over the projection 216 until the projection 216 aligns with and snaps or otherwise extends into the slot 220, thereby locking the subframe 140 in the third or extended position and also locking the frame 136 and the main connector 62 in the second and engaged positions, respectively. Actuating (e.g., pushing or depressing) the release button 212 lowers the projection 216, thereby removing the projection 216 from the slot 220 such that the subframe 140, the frame 136, and the main connector 62 can return to a recessed position (i.e., the first position (FIG. 5)) under the influence of the biasing members 188 and biasing member 200. The illustrated release button 212 also includes a locking mechanism such that a user may lock the release button 212 in place so that the projection 216 cannot be moved out of the slot 220. Locking the release button 212 also generally prohibits movement of the subframe 140 and frame 136 toward the first and second positions (FIGS. 5 and 6), which would in turn release the connector 62 from the back of the computer. In this regard, the computer is also substantially locked to the docking station 10. The locking mechanism generally helps prevent the portable computer connected to the docking station 10 from being unintentionally released or stolen.

As shown in FIGS. 10 and 11, the docking station 10 also includes an interlock 224 positioned within the chamber 82 to prevent the frame 136, and thereby the main connector 62 and the subframe 140, from moving away from the retracted or disengaged position when a computer is not positioned on the support portion 18. The illustrated interlock 224 includes a leaf spring 228 having a first end portion 232 and a second end portion 236. The first end portion 232 is coupled to the inner surface 78 of the support portion 18 with a fastener 240 (e.g., a screw), although other suitable fastening means may also be employed. A button or projection 244 (FIG. 1) extends from the leaf spring 228 through an opening 248 in the top surface 30 of the support portion 18. As shown in FIG. 10, when the frame 136 is in the first position, the leaf spring 228 biases the second end portion 236 into engagement with a notch 252 defined in an edge of the frame 136. In addition, the button 244 extends upwardly through the opening 248 and projects above the top surface 30. In this position, the interlock 224 inhibits the frame 136 from sliding from the recessed position (FIGS. 5 and 10) to the extended position (FIGS. 6, 7, and 11). As shown in FIG. 11, when a portable computer is positioned on the top surface 30 of the support portion 18, the computer actuates (e.g., depresses or pushes) the button 244, thereby moving the button 244 and the second end portion 236 downwardly (e.g. toward the lower portion 26) against the bias of leaf spring 228. The second end portion 236 is thus moved to a disengaged position in which the second end portion 236 is clear of the notch 252 in the frame 136, which in turn leaves the frame 136, the subframe 140, and the main connector 62 free to slide between the first, second, and third positions without interference from the interlock 224. Thus, the main connector 62 cannot be moved to its engaged position unless the button 244 is depressed, such as when a computer is placed on the top surface 30 of the support portion 18.

To connect or "dock" a portable computer to the docking station 10, a user positions the computer on the top surface 30 of the support portion 18 such that the studs 50, 54 are received within the corresponding apertures in the bottom of the computer and the lip 58 of the flange 46 extends over the front of the computer. As the computer is positioned on the top surface 30, the computer pushes the button 244 of the interlock 224 downwardly relative to the top surface 30 such that the leaf spring 228 is disengaged from the notch 252 in the frame 136.

The user then pulls the handle 144 away from the back portion 22, thereby moving the frame 136 and the subframe 140 from the first position (FIG. 5) to the second position (FIG. 6). The frame 136 likewise moves the main connector 62 to the engaged position so at least a portion of the main connector 62 extends through the opening 74 in the back portion 22 (as illustrated) or, alternatively, through an opening in the support portion 18 (not illustrated) for engagement or interfacing with a receptacle in the back and/or underside of the computer. After the main connector 62 engages the computer, the user continues to pull the handle 144 forwardly to move the subframe 140 relative to the frame 136 from the second position to the third, extended position (FIG. 7). When the subframe 140 reaches the third position the handle 144 is generally flush with the front surface 34, and the slot 220 in the subframe 140 moves into alignment with the projection 216 of the release button 212, such that the projection 216 snaps into engagement with the slot 220 to secure the subframe 140, the frame 136, and the main connector 62 in place. If desired, the user may insert and turn a key within the locking mechanism of the release button 212 to lock the computer to the docking station 10.

The user may rotate the docking station 10 about the swivel 122 of the mounting apparatus 106 to change the orientation of the docking station 10 and the computer. In addition, the user may rotate the knob 134 to separate the support brackets 110, 114, thereby allowing adjustment of the tilt of the docking station 10 and the computer relative to the vehicle. The user may then retighten the knob 134 to secure the docking station 10 and the computer in the desired position.

To disconnect or "undock" the computer from the docking station 10, the user pushes the release button 212 to move the projection 216 out of the slot 220 in the subframe 140. If the release button 212 is locked, the user will first have to unlock the release button 212 with the key. When the release button 212 is actuated, the biasing member 200 biases (i.e., moves) the subframe 140 toward the frame 136 from the third position (FIG. 7) to the second position (FIG. 6). Similarly, the biasing members 188 move the frame 136 and the subframe 140 from the second position (FIG. 6) to the first position (FIG. 5), and thereby move the main connector 62 from the engaged position to the disengaged position. As the frame 136, the subframe 140, and the main connector 62 move toward the recessed and disengaged positions, the main connector 62 slides out of engagement with the portable computer such that the user may lift the computer away from the docking station 10.

The illustrated support portion 18 of the docking station 10 is die cast from a magnesium or aluminum based alloy such that the docking station 10 is easy to manufacture and assemble. In addition, die casting the support portion 18 gives the docking station 10 a robust design that is durable and water resistant.

Various features and advantages of the invention are set forth in the following claims.

What is claimed is:

1. A computer docking station for supporting and electrically coupling to a portable computer that includes a docking connector, the computer docking station comprising:

a body including a support portion configured to support the portable computer;

a main connector moveable relative to the body between an engaged position in which the main connector is engageable with the docking connector, and a disengaged position;

a frame coupled to the body and the main connector, the frame movable relative to the body between a first position, in which the main connector is in the disengaged position, and a second position, in which the main connector is in the engaged position; and a handle coupled to the frame, wherein the handle is operable to move the frame from the first position to the second position;

a first biasing member coupled between the body and the frame, wherein the first biasing member biases the frame toward the first position; and a second biasing member coupled between the handle and the frame, wherein the second biasing member biases the frame toward the second position to inhibit movement of the main connector away from the engaged position.

2. The computer docking station of claim 1, wherein the first biasing member is stiffer than the second biasing member.

3. The computer docking station of claim 1, wherein the frame slides generally linearly relative to the body between the first and second positions, and wherein the handle slides generally linearly relative to the body to move the frame between the first and second positions.

4. The computer docking station of claim 3, wherein the body includes a back portion extending upwardly from the support portion and at least partially defining an opening through which the main connector extends when in the engaged position, wherein the support portion defines a front surface located substantially opposite the back portion, and wherein the frame and the handle slide toward the front surface as the frame moves from the first position to the second position.

5. The computer docking station of claim 4, wherein the body defines an outer surface, wherein the handle is recessed relative to the outer surface when the frame is in the first position and the handle is substantially flush with the outer surface when the frame is in the second position.

6. The computer docking station of claim 1, further comprising a latching mechanism coupled to the body, wherein a portion of the latching mechanism engages the handle upon movement of the frame to the second position to releasably hold the frame in the second position.

7. The computer docking station of claim 1, wherein the frame is slidably coupled to the body, wherein the handle is slidably coupled to the frame, and wherein the frame carries the handle.

8. The computer docking station of claim 1, further comprising an interlock having a first end portion coupled to the body and a second end portion substantially opposite the first end portion and movable relative to the body, wherein the second end portion engages the frame to inhibit movement of the frame from the first position to the second position, and wherein the second end portion is moved out of engagement with the frame when the portable computer is positioned on the support surface.

9. The computer docking station of claim 8, wherein the interlock includes a leaf spring and a projection that extends through an opening in the support portion, and the frame includes an interlock cutout, wherein the second end portion is moveable into and out of engagement with the interlock cutout in response to movement of the projection through the opening, and wherein the second end portion is biased into engagement with the interlock cutout.

10. The computer docking station of claim 1, wherein the support portion defines a front surface and movement of the handle towards the front surface applies a biasing force to the main connector tending to resist movement of the main connector away from the engaged position.

11. A computer docking station for supporting and electrically coupling to a portable computer, the computer docking station comprising:

a body including a support portion configured to support the portable computer;

a [main] connector *to facilitate coupling peripheral components to the portable computer, the connector being* moveable with respect to the body between an engaged position, in which at least a portion of the [main] *moveable* connector is positioned above the support portion, and a disengaged position;

a frame coupled to the body and the [main] *moveable* connector, the frame movable generally linearly relative to the body between a first position, in which the [main] *moveable* connector is in the disengaged position, and a second position, in which the [main] *moveable* connector is in the engaged position, the frame defining a notch formed along an edge of the frame;

a handle coupled to the frame, wherein the handle is operable to move the frame between the first position and the second position;

a first biasing member coupled between the frame and the handle, the first biasing member biasing the frame toward the handle and resisting movement of the [main] *moveable* connector away from the engaged position when the frame is in the second position;

a second biasing member coupled between the body and the frame, the second biasing member biasing the frame toward the first position, the first biasing member being stiffer than the second biasing member; and an interlock including a first end portion coupled to the body, a second end portion substantially opposite the first end portion and movable relative to the body, the second end portion fitting within the notch in the frame to inhibit movement of the frame from the first position to the second position, and a projection extending through the support portion of the body, the projection configured to be actuated by the portable computer when the portable computer is positioned on the support portion to move the second end portion out of the notch in the frame.

12. The computer docking station of claim 11, wherein the body includes a back portion extending upwardly from the support portion and at least partially defining an opening, wherein the support portion defines a front surface located substantially opposite the back portion, and wherein the frame and the handle slide toward the front surface as the frame moves from the first position to the second position.

13. The computer docking station of claim 11, wherein the body defines an outer surface and the handle is recessed relative to the outer surface when the frame is in the first position and the handle is substantially flush with the outer surface when the frame is in the third position.

14. The computer docking station of claim 11, wherein the interlock further includes a leaf spring having the first end portion and the second end portion, the leaf spring biasing the second end portion into the notch in the frame, and a fastener coupling the first end portion of the leaf spring to the body.

15. The computer docking station of claim 11, further comprising a latching mechanism coupled to the body, wherein a portion of the latching mechanism engages the handle upon movement of the frame to the second position to releasably hold the frame in the second position.

16. The computer docking station of claim 15, wherein the latching mechanism is releasable and wherein upon release of the latching mechanism the first biasing member and the second biasing member cooperate to move the frame relative to the body from the second position to the first position, and the second biasing member moves the frame relative to the body from the second position to the first position.

17. The computer docking station of claim 11, wherein movement of the frame and from the first position to the second position using the handle overcomes a bias of the second and first biasing members.

18. A computer docking station for supporting and electrically coupling to a portable computer [that includes a docking connector], the computer docking station comprising:

a body including a support portion configured to support the portable computer;

a [main] connector *to facilitate coupling peripheral components to the portable computer, the connector being* moveable relative to the body between an engaged position, in which the [main] *moveable* connector is engageable with the [docking connector] *portable computer*, and a disengaged position;

a frame coupled to the body and the [main] *moveable* connector, the frame movable relative to the body between a first position, in which the [main] *moveable* connector is in the disengaged position, and a second position, in which the [main] *moveable* connector is in the engaged position; and a handle coupled to the frame, wherein the handle is operable to move the frame from the first position to the second position and is movable to a third position relative to the frame after the frame has moved to the second position and the [main] *moveable* connector is in the engaged position to inhibit movement of the [main] *moveable* connector away from the engaged position.

19. The computer docking station of claim 18 further comprising a first biasing member coupled between the handle and the frame, wherein when the handle is in the third position the first biasing member biases the frame toward the second position to inhibit movement of the [main] *moveable* connector away from the engaged position.

20. The computer docking station of claim 19 further comprising a second biasing member coupled between the body and the frame, wherein the second biasing member biases the frame toward the first position.

*21. A computer docking station for supporting and electrically coupling to a portable computer, the computer docking station comprising:*

*a body including a support portion configured to support the portable computer;*

*a connector for coupling to the portable computer, the connector being moveable relative to the body between an engaged position, in which the moveable connector is engageable with the portable computer, and a disengaged position;*

*a frame coupled to the body and the moveable connector, the frame movable relative to the body between a first position, in which the moveable connector is in the disengaged position, and a second position, in which the moveable connector is in the engaged position; and*

*a handle coupled to the frame, wherein the handle is operable to move the frame from the first position to the second position;*

*a first biasing member coupled between the body and the frame, wherein the first biasing member biases the frame toward the first position; and*

*a second biasing member coupled between the handle and the frame, wherein the second biasing member biases the frame toward the second position to inhibit movement of the moveable connector away from the engaged position.*

*22. The computer docking station of claim 21, wherein the first biasing member is stiffer than the second biasing member.*

*23. The computer docking station of claim 21, wherein the frame slides generally linearly relative to the body between the first and second positions, and wherein the handle slides generally linearly relative to the body to move the frame between the first and second positions.*

*24. The computer docking station of claim 23, wherein the body includes a back portion extending upwardly from the support portion and at least partially defining an opening through which the moveable connector extends when in the engaged position, wherein the support portion defines a front surface located substantially opposite the back portion, and wherein the frame and the handle slide toward the front surface as the frame moves from the first position to the second position.*

*25. The computer docking station of claim 24, wherein the body defines an outer surface, wherein the handle is recessed relative to the outer surface when the frame is in the first position and the handle is substantially flush with the outer surface when the frame is in the second position.*

*26. The computer docking station of claim 21, further comprising a latching mechanism coupled to the body,*

*wherein a portion of the latching mechanism engages the handle upon movement of the frame to the second position to releasably hold the frame in the second position.*

*27. The computer docking station of claim 21, wherein the frame is slidably coupled to the body, wherein the handle is slidably coupled to the frame, and wherein the frame carries the handle.*

*28. The computer docking station of claim 21, further comprising an interlock having a first end portion coupled to the body and a second end portion substantially opposite the first end portion and movable relative to the body, wherein the second end portion engages the frame to inhibit movement of the frame from the first position to the second position, and wherein the second end portion is moved out of engagement with the frame when the portable computer is positioned on the support surface.*

*29. The computer docking station of claim 28, wherein the interlock includes a leaf spring and a projection that extends through an opening in the support portion, and the frame includes an interlock cutout, wherein the second end portion is moveable into and out of engagement with the interlock cutout in response to movement of the projection through the opening, and wherein the second end portion is biased into engagement with the interlock cutout.*

*30. The computer docking station of claim 21, wherein the support portion defines a front surface and movement of the handle towards the front surface applies a biasing force to the moveable connector tending to resist movement of the moveable connector away from the engaged position.*

*31. A computer docking station for supporting and electrically coupling to a portable computer, the computer docking station comprising:*

*a body including a support portion configured to support the portable computer;*

*a connector for coupling to the portable computer, the connector being moveable relative to the body between an engaged position, in which the moveable connector is engageable with the portable computer, and a disengaged position;*

*a frame coupled to the body and the moveable connector, the frame movable relative to the body between a first position, in which the moveable connector is in the disengaged position, and a second position, in which the moveable connector is in the engaged position; and*

*a handle coupled to the frame, wherein the handle is operable to move the frame from the first position to the second position and is movable to a third position relative to the frame after the frame has moved to the second position and the moveable connector is in the engaged position to inhibit movement of the moveable connector away from the engaged position.*

*32. The computer docking station of claim 31 further comprising a first biasing member coupled between the handle and the frame, wherein when the handle is in the third position the first biasing member biases the frame toward the second position to inhibit movement of the moveable connector away from the engaged position.*

*33. The computer docking station of claim 32 further comprising a second biasing member coupled between the body and the frame, wherein the second biasing member biases the frame toward the first position.*

* * * * *